UNITED STATES PATENT OFFICE.

ADOLF MARKUS, OF DRESDEN, GERMANY, ASSIGNOR TO AUGUST PRÉE, OF DRESDEN, GERMANY.

PROCESS OF MANUFACTURING A WATERPROOF MORTAR.

1,082,035. Specification of Letters Patent. Patented Dec. 23, 1913.

No Drawing. Application filed July 17, 1912. Serial No. 710,037.

*To all whom it may concern:*

Be it known that I, ADOLF MARKUS, a subject of the Emperor of Austria-Hungary, and residing at Dresden, N, Germany, have invented certain new and useful Improvements in Processes of Manufacturing a Waterproof Mortar, of which the following is a specification.

This invention relates to a process which allows of rendering mortar water proof simply by adding to it a pulverulent composition, as more fully described hereinafter.

It has already been proposed to make masonry water proof by sprinkling it with a solution of soap and alum, but no satisfactory result has been obtained by that means. It has further been proposed to use sebacate of alumina in a dry state as an addition to mortar, but the practical experiments made with such mortar have revealed the fact, that the mortar binds but imperfectly and is not water proof when subjected to high water pressure. This drawback has, however, been overcome by preparing a composition of matter obtained by treating a solution of oleate of ammonium first with calcium hydroxid and then with a solution of sulfate of aluminum, so as to obtain sulfate of calcium and aluminate of calcium and oleate of aluminum and of calcium. This composition of matter when added to the mortar renders it in fact water proof under any conditions and neither reduces the strength of the mortar nor shortens the time of binding. This procedure, however, is not suited for general application because of its disadvantages, since it requires the transportation with it of a large amount of water (about 80% of its mass); while its admixture and incorporation, generally by unskilled hands, is often imperfect and incomplete, causing lack of homogeneity; and its use is precluded where such pulverulent materials are required as in materials for plastering and for artificial stones, (mortar for coating or surfacing the outside of buildings and the like).

Now I have discovered that the formation of a pulpy flaky aluminate of lime, in connection with oleate of calcium and aluminum, takes place also when soap, such as oleate of sodium and caustic lime, or hydrate of lime, are mixed up with water and with soluble aluminates. Based on said observations I have found it possible to produce a dry, pulverulent mixture of powdered soap, any of the known soluble aluminates and caustic lime or hydrate of lime. This composition of matter is added to and mixed with the component parts of the mortar to be formed; and when the whole mixture is wet, or stirred up with water, so as to be made into the mortar proper, said composition of matter, in connection with the particles of the mortar and the water, is converted into a pulp of aluminates of lime with aluminum and lime soaps. The pulp is distributed practically uniformly throughout the whole mass or bulk of the mortar, in fact, far more uniform than can be attained by adding it already formed as hitherto. The action of the composition of matter is more energetic, the quality of the mortar is improved, and the composition can be used also in connection with dry substances, such as employed for instance in the manufacture of artificial stone and the like. Where the ingredients are thus added in a finely divided dry state to the mortar, and made to react with the water added to the mortar to form the insoluble water-proofing ingredients, these ingredients are thus formed in the mortar itself, and are, so to speak, made to form *in situ*. Owing to the ease with which thorough intermixture of dry materials is effected, and the finely divided nature of the dry materials, a thorough and substantially homogeneous mixture is possible, and a resulting thorough waterproofing of the mortar is attained. The waterproofing is effected in a similar manner when the dry materials are first diluted with an indifferent material such as clay, such dilution causing a more even spreading out of the mixture through the mortar and giving a more uniform mixture with the mortar, with less tendency for the formation of lumps.

What I claim as new and desire to secure by Letters Patent is:

1. The process of manufacturing a water proof mortar, consisting in mixing a pulverized soluble soap, a pulverized soluble aluminate, and pulverized hydrate of lime with each other, and adding the mixture to the mortar.

2. The process of manufacturing a water proof mortar, consisting in mixing a pulverized soap of oleate of sodium, a pulverized soluble aluminate, and pulverized hydrate of lime with each other, and adding the mixture to the component parts of the mortar.

3. The process of manufacturing a water proof mortar, consisting in mixing a pulverized soluble soap, a pulverized soluble aluminate, and pulverized caustic lime with each other, and adding the mixture to the component parts of the mortar before the formation of the mortar therefrom.

4. The process of manufacturing a water proof mortar, consisting in mixing a pulverized soluble soap, a pulverized soluble aluminate, pulverized hydrate of lime, and a pulverized indifferent substance with each other, adding the mixture to the component parts of the mortar, and mixing up the whole with water by stirring.

5. The process of manufacturing a water proof mortar, consisting in mixing a pulverized soluble soap, a pulverized soluble aluminate, pulverized hydrate of lime, and pulverized clay with each other, adding the mixture to the component parts of the mortar to be produced and converting the whole into mortar by stirring it with water.

In testimony whereof I affix my signature in presence of two witnesses.

ADOLF MARKUS.

Witnesses:
PAUL ARRAS,
ARTHUR GUBE.

Copies of this patent may be obtained for five cents each, by addressing the "Commissioner of Patents, Washington, D. C."